March 27, 1945.  W. A. RAY  2,372,393
CONTROL SYSTEM
Filed Sept. 11, 1943
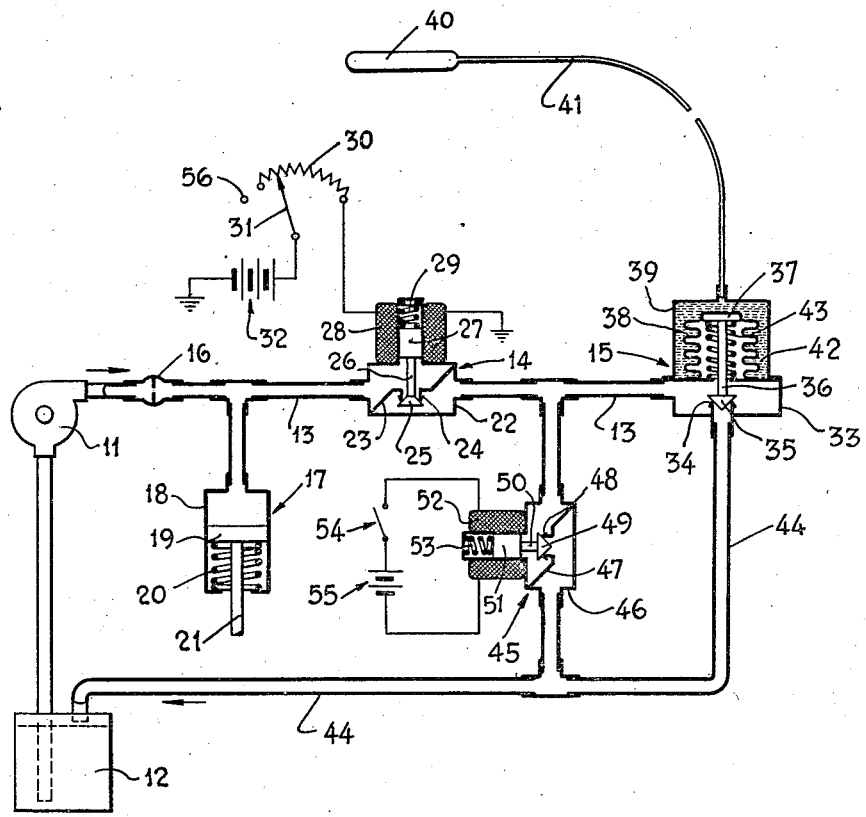
Inventor:
WILLIAM A. RAY,
By John H. Rouse,
Attorney.

Patented Mar. 27, 1945

2,372,393

UNITED STATES PATENT OFFICE 2,372,393

CONTROL SYSTEM

William A. Ray, Los Angeles, Calif.

Application September 11, 1943, Serial No. 502,013

3 Claims. (Cl. 121—38)

My present invention relates to fluid pressure systems which include a motor operated in response to variations of the system pressure, and a throttling valve automatically operated in response to variations of the magnitude of a controlling condition (such as temperature or pressure) for controlling the pressure in the system.

An object of this invention is to provide, in a system of the character described, an additional throttling valve, the operation of which is manually controllable to independently effect variation of the system pressure. Such an arrangement has particular utility when it is desirable, under some conditions, to adjust the position of the motor with respect to that which it normally assumes under the control of the automatic condition-responsive device—or, in effect, to adjust the calibration of that device. As a specific illustration, when the system is employed in connection with automatic control of the temperature of an aircraft engine and the motor is arranged to operate the customary "flaps" which controls passage of cooling air to the engine or to the radiator therefor, the manually-controllable means of this invention permits the pilot to adjust the position of the flaps for a given engine temperature to suit the particular conditions of flight.

A more specific object is to provide electromagnetic operating means for the "additional" throttling valve, and manually operable means for controlling the energization of the electromagnetic means from a location remote from the valve and operating means.

Another object is to provide, in a system of the character described hereinabove, valve means bypassing one of the throttling valves, said valve means being normally closed and operable to open condition to render the by-passed one of the throttling valves substantially ineffective to control the fluid pressure in the system, so that the other of the throttling valves is in command. As an illustration of the utility of this arrangement, the aircraft engine-temperature control system mentioned above may thereby be placed solely under manual control, so that the flaps can be positioned as required by abnormal conditions of flight or "take-off."

Other objects and advantages of the invention will be found in the description, the drawing, and the claims; and, for complete understanding of the invention, reference may be had to the following detailed description and accompanying drawing, the single figure of which is a diagrammatic view of a fluid pressure control system embodying the invention.

In the drawing, the numeral 11 indicates a pump which serves to draw fluid from a reservoir 12 and to force it, in the direction of the arrow, through a conduit 13 wherein is connected a pair of throttling valves generally indicated at 14 and 15; valve 14 being electromagnetically operable and valve 15 thermostatically. A flow-restricting device 16 is inserted at the outlet of the pump, and connected to the conduit between this device and the valve 14 is a fluid pressure motor 17 which comprises a cylinder 18 containing a reciprocable piston 19 which is inwardly biased by a compression spring 20. Extending from the piston 19 is a stem 21 for connection to a device to be operated.

The valve 14 comprises a casing 22 having an apertured partition 23 which provides a downwardly-faced valve seat 24. Cooperable with this seat is a closure 25 having a stem 26 which is connected to a magnetic plunger 27. The plunger is reciprocable in a tubular extension of the valve casing, around which is an energizing coil 28, and is downwardly biased by a compression spring 29. One lead of the coil 28 is grounded, as indicated, and the other lead is connected to one end of a resistance element 30, upon which a pivoted contact arm 31 rides; the contact arm being grounded in series with a source of energy 32 to complete the electrical circuit.

The valve 15 comprises a casing 33 having a valve seat 34 with which a closure 35 cooperates. The stem 36 of the closure is attached to the end wall or head 37 of an inverted cup-shaped expansible-contractible bellows 38, the bottom end of which closes an opening through the top wall of the casing. Surrounding the bellows is a housing 39 to which a thermal bulb 40 is connected by a capillary tube 41, these parts being charged with a thermal fluid indicated at 42. A compression spring 43 urges the bellows head 37, and therewith stem 36 and closure 35, upward. The outlet of valve 15 is connected to a conduit 44 by means of which the fluid is conveniently returned to the reservoir 12.

Connected to the conduits 13 and 44, so as to by-pass valve 15, is an electromagnetically operated valve 45 of the non-throttling type. This valve comprises a casing 46 having an apertured partition 47 which provides a valve seat 48. Cooperable with the seat is a closure 49 having a stem 50 which is connected to a magnetic plunger 51. The plunger is reciprocable in a tubular extension of the casing, around which is an energizing coil 52, and is biased to valve-closing position by a compression spring 53. The leads of coil 52 are connectable, through a switch 54, to a source of energy 55.

The operation of the system will be described, by way of illustration, in connection with the control of temperature of an aircraft engine; it being assumed that the thermal bulb 40 is responsive to the temperature of the engine, that the motor 17 is connected to operate the cooling flaps, and that the rheostat, comprising resistance element 30 and contact arm 31, is located in the control compartment, as is likewise switch 54 of the by-pass valve 45.

Operation of the system under the sole control of the thermostatic throttling valve 15 will first be described; switch 54 then being open and the by-pass valve 45 therefore closed, and rheostat arm 31 at a point 56, out of contact with the resistance element 30, so that the throttling valve 14 is deenergized and hence fully open. Under such conditions, it will be observed that substantially the only resistance to the flow of fluid through conduit 13 is that offered by valve 15. If the temperature of the thermal bulb 40 rises, the closure 35 of valve 15 is moved closer to its seat 34 due to the increase of pressure of the thermostatic fluid acting on bellows head 37, so that the fluid pressure in conduit 13 is likewise increased and the piston 19 of motor 17 forced downwardly against the bias of spring 20—the cooling flaps, connected (directly, or through an auxiliary motor) to the stem 21 of piston 19, being moved to a wider-open position. Conversely, if the temperature of the thermal bulb falls, the fluid pressure in conduit 13 is reduced and the flaps moved toward closed position due to the resultant rise of the motor piston. The position of piston 19 is thus, within its operating range, a function of the temperature of bulb 40. The flow-restricting device 16 is of such capacity that, when both of the throttling valves 14 and 15 are fully open, the fluid pressure in conduit 13 is substantially at zero gauge and the motor piston in fully elevated position.

When the manually-controllable valve 14 is employed in the system, the thermostatic valve 15 is preferably so calibrated that the normal desired relation between engine temperature and flap position is realized when the manually-controllable valve is weakly energized (i. e., when rheostat arm 31 is in contact with a portion of resistance element 30 near the free end thereof) and the closure 25 is hence attracted (against the bias of spring 29) to such position with respect to its seat 24 that some appreciable resistance is offered by it to the flow of fluid—the fluid pressure in conduit 13 then being proportional to the combined throttling effect of valves 14 and 15. If it is then desired to alter the relation between engine temperature and the position of piston 19 (to which the position of the flap corresponds), the contact arm is moved in the proper direction to effect the change. Since the closure 25 is so arranged that the passage of the fluid tends to open it, the position of the closure with respect to its seat is normally determined by the resultant of the fluid pressure and the spring and magnetic forces acting on the closure.

While valve 14 obviously could be so constructed that the force of the bias spring is in a direction tending to close the valve and the magnetic force in the opposite direction—the arrangement illustrated is generally preferred since in the event of accidental interruption of the electrical circuit the closure then moves to open position (rather than toward closed position, as in the first-mentioned arrangement) wherein it has substantially no effect upon the system pressure; but, inasmuch as the degree of control afforded by the valve 14 is normally small with respect to that of the thermostatic valve, the circuit interruption may cause but little trouble.

In the foregoing description of the operation of the system, it was assumed that the by-pass valve 45 was always closed. If, however, it is desired to place the system solely under manual control (as, for instance, in the event of failure of the thermostatic valve 15), valve 45 is energized to open position by closure of switch 54—rendering the valve 15, thus by-passed, substantially ineffective to control the fluid pressure in conduit 13. Positioning of the motor piston 19 can then be effected by movement of contact arm 31 through the full range of resistance element 30.

It is apparent that, while the throttling valves 14 and 15 are shown connected in series relation in conduit 13, they could be arranged in parallel to each other to effect combined control of the fluid pressure. Also, while the controlled fluid is preferably a liquid such as is commonly employed in the hydraulic systems of aircraft, it could be an elastic fluid such as air; and the pressure of the source could be sub-atmospheric instead of super-atmospheric as described. I wish it to be understood that still further modifications may be made without departing from the spirit of the invention, and that I intend therefore to be limited only by the scope of the appended claims.

I claim as my invention:

1. In a fluid pressure control system: a conduit, a source of pressure fluid for said conduit, a pair of throttling valves for so controlling passage of said fluid through the conduit that the pressure of the fluid therein is proportional to the combined throttling effect of the valves, condition responsive means for automatically controlling the operation of one of said valves, said other of the valves being so constructed and arranged that the pressure of the fluid in the conduit can effect opening movement thereof, manually controllable means for so urging said other of the valves toward closed position as to adjust the throttling condition thereof, and a motor connected to said conduit and operated in response to variations of the pressure of the fluid therein.

2. A control system, as defined in claim 1, including means for biasing said other of the valves toward open position.

3. In a fluid pressure control system: a conduit, a source of pressure fluid for said conduit, a pair of throttling valves for so controlling passage of said fluid through the conduit that the pressure of the fluid therein is proportional to the combined throttling effect of the valves, condition responsive means for automatically controlling the operation of one of said valves, said other of the valves being so constructed and arranged that the pressure of the fluid in the conduit can effect opening movement thereof, means biasing said other of the valves toward open position, electromagnetic means for producing a force urging said other of the valves toward closed position, manually operable means for controlling the energization of said electromagnetic means and thereby the throttling condition of said other of the valves, and a motor connected to said conduit and having an operating member positionable in accordance with the pressure of the fluid in the conduit.

WILLIAM A. RAY.